(12) United States Patent
Hein et al.

(10) Patent No.: US 10,358,692 B2
(45) Date of Patent: Jul. 23, 2019

(54) PROCESS FOR METAL EXTRACTION WITH SORPTION LEACHING IN WET SOLIDS

(71) Applicants: INNOVECO AUSTRALIA PTY. LTD., Victoria (AU); ORYXEIO INGENIERÍA LIMITADA, Santiago (CL)

(72) Inventors: Hans Christian Hein, Santiago (CL); Pavel Spiridonov, Victoria (AU); Ricardo Oliver Hein Hoernig, Santiago (CL)

(73) Assignees: INNOVECO AUSTRALIA PTY. LTD., Victoria (AU); ORYXEIO INGENIERÍA LIMITADA, Santiago (CL)

( * ) Notice: Subject to any disclaimer, the term of this patent is extended or adjusted under 35 U.S.C. 154(b) by 162 days.

(21) Appl. No.: 15/521,306

(22) PCT Filed: Oct. 16, 2015

(86) PCT No.: PCT/IB2015/057974
§ 371 (c)(1),
(2) Date: Apr. 24, 2017

(87) PCT Pub. No.: WO2016/063187
PCT Pub. Date: Apr. 28, 2016

(65) Prior Publication Data
US 2017/0306440 A1 Oct. 26, 2017

(30) Foreign Application Priority Data
Oct. 22, 2014 (AU) ................................ 2014904227

(51) Int. Cl.
C22B 3/42 (2006.01)
C22B 1/00 (2006.01)
(Continued)

(52) U.S. Cl.
CPC .................. *C22B 3/42* (2013.01); *C22B 1/00* (2013.01); *C22B 3/04* (2013.01); *C22B 3/06* (2013.01);
(Continued)

(58) Field of Classification Search
CPC ................ C22B 1/00; C22B 3/04; C22B 3/24
See application file for complete search history.

(56) References Cited

U.S. PATENT DOCUMENTS 10,047,412 B2 * 8/2018 Yahorava ................ C22B 11/08
2003/0200839 A1 * 10/2003 Jenkins ................... C22B 11/08
75/741
(Continued)

*Primary Examiner* — Tima M. McGuthry-Banks
(74) *Attorney, Agent, or Firm* — Hoglund & Pamias, PSC; Roberto J. Rios

(57) ABSTRACT

A hydrometallurgical process is provided for the selective extraction of one or more target metals from ore, concentrates, tailings, slags or other metal bearing solids, by combining simultaneously leaching with sorption in the state of wet solids. The sorption and leaching are performed simultaneously, which reduces the required number of process stages in comparison to conventional technologies. Performing the sorption leaching in wet solids enables a significant increase in the concentration of leaching agents in relation to target metal(s) content in solids, at the same addition rate of said leaching agents, improving thermodynamic conditions and leaching kinetics for dissolving target metal(s). The invention has the main advantage of improving metal recoveries at a reduced consumption rate of leaching agents.

18 Claims, 3 Drawing Sheets

(51) Int. Cl.
*C22B 3/06* (2006.01)
*C22B 3/12* (2006.01)
*C22B 3/24* (2006.01)
*C22B 3/04* (2006.01)

(52) U.S. Cl.
CPC ................. *C22B 3/12* (2013.01); *C22B 3/24* (2013.01); *Y02P 10/234* (2015.11)

(56) References Cited

U.S. PATENT DOCUMENTS

2010/0326920 A1* 12/2010 Cutler .................... B01D 15/00 210/670
2015/0360984 A1* 12/2015 Abuhasel ................ C02F 3/322 435/134
2016/0032420 A1* 2/2016 Neylon ................... C22B 11/08 75/744

* cited by examiner

PROCESS FOR METAL EXTRACTION WITH SORPTION LEACHING IN WET SOLIDS

FIELD OF THE INVENTION

The present invention relates to a hydrometallurgical process for selectively extracting one or more target metals, such as copper, nickel, cobalt, zinc, silver, gold, platinum, palladium, rhodium, mercury, chromium, cadmium, molybdenum, rhenium, uranium, among others, from ore, concentrates, tailings, slags, or other metal bearing solids. The process combines simultaneously leaching with sorption in the state of wet solids, wherein leaching agents are blended with one or more sorbents, such as ion exchange resins, activated carbon, zeolites, among others, and mixtures thereof.

BACKGROUND OF THE INVENTION

Hydrometallurgical processes involve the use of aqueous chemistry to recover metals from ores, concentrates, tailings, slags or other materials, and can be typically divided into three general categories: leaching, concentration/purification, and metal recovery.

Leaching involves the dissolution of desired metal components into an aqueous phase, by contacting an aqueous solution that contains leaching agents, called leach solution or lixiviant, with the metal bearing material. The lixiviant may be acidic or basic in nature. Common leaching agents are sulphuric acid, hydrochloric acid, nitric acid, phosphoric acid, carbonic acid, citric acid, acetic acid, formic acid, ammonia, cyanide, urea, thiourea, thiosulphate, among others, together with salts such as sulphates, chlorides, nitrates, phosphates, carbonates, ammonium salts, acetates, peroxides, cyanides, formates, citrates, bromides, among others, including also oxidising and reducing agents like oxygen, hydrogen peroxide, calcium peroxide, sulphur dioxide, ferric nitrate, magnesium oxide, manganese dioxide, elemental iron, scrap metals, air, and others, together with catalysts and other additives. Some traditional leaching techniques are in-situ leaching, heap leaching, dump leaching, agitation leaching, vat leaching, and pressure leaching. In-situ leaching involves the introduction of the leach solution directly into the ore deposit, after opening and evaluating appropriate pathways for its penetration. Heap leaching is performed on crushed ore that is piled on a heap, typically after agglomeration and curing of the ore, allowing the lixiviant to percolate through the heap. In dump leaching a coarser ore, typically a run-of-mine ore without crushing, is loaded on a dump of increased height, allowing the lixiviant to percolate through the dump. Agitation leaching, also known as tank leaching or slurry leaching, involves material that is ground sufficiently fine so as to form a slurry or pulp, i.e., a fluid mixture of a pulverised solid with a liquid that can flow under gravity or when pumped by centrifugal pumps, being the tanks typically equipped with mechanical agitators or gas introduction equipment to achieve leaching by maintaining the solids in suspension in the slurry. In vat leaching the lixiviant percolates through a typically coarser material, loaded in a vat under flooded conditions. Agitation leaching is typically continuous while vat leaching is usually batch operated. Another process for leaching slurries is pressure leaching, which involves closed autoclaves or pressure vessels, whereby leaching is carried out at higher pressures and temperatures, e.g., the Sherritt Gordon ammonia pressure leaching process.

After leaching, the resulting pregnant solution or pulp with dissolved metals in most cases is subject to concentration and purification processes to increase the metal content and to remove undesired impurities. Such concentration/purification may include solvent extraction (SX), precipitation, sorption, among others. In solvent extraction the dissolved metals are extracted from the pregnant leach solution to an organic solvent, from where they are then stripped into an aqueous electrolyte solution. Impurities and contaminants sometimes are also removed in a similar way. Precipitation involves generating a solid precipitate from the pregnant leach solution either by cementation, whereby ions are reduced to zero valence with a reducing agent, or by crystallisation, whereby the solubility conditions of dissolved metals or contaminants are changed, e.g., by reagent addition, temperature change or evaporation. In sorption the dissolved metals or the impurities are extracted from the pregnant leach solution or pulp into a sorbent, from which they are then desorbed (or eluted) with an eluent to an eluate. Such a sorbent is usually an insoluble solid material to which another type of substance becomes attached by means of absorption, adsorption, or ion exchange (IX). Absorption refers to the incorporation of a substance in one state into another of a different state, e.g., liquids being absorbed by a solid or gases being absorbed by a liquid. Adsorption denotes the physical adherence or bonding of ions and molecules onto the surface of another phase, e.g., reagents adsorbed to a solid catalyst surface. Ion exchange involves a reversible interchange of ions usually between an insoluble solid material, called ion exchanger, and a solution phase. Ion exchangers can be unselective or have binding preferences for certain ions or classes of ions, depending on their chemical structure. Common commercial sorbents that have been used in large-scale processes include activated carbon, zeolites, clays, and ion exchange resins (also known as ion exchange polymers).

Concentration/purification is then usually followed by a metal recovery process, which may involve electrowinning, precipitation (cementation/crystallisation), among others, sometimes combined with smelting and electrorefining, to produce the final metal product, either in its metallic state or as a chemical compound. Typically, electrowinning and electrorefining respectively involve the recovery and purification of metals using electrodeposition of metals on the cathode, and either an oxidation reaction or a metal dissolution on the anode.

For example, hydrometallurgical copper production usually involves the traditional techniques of agglomeration, curing, and heap leaching in acid media, typically sulphuric acid, followed by solvent extraction and electrowinning, producing copper cathodes of great purity as final product.

The main goal of a hydrometallurgical process, and of extractive metallurgy in general, is to achieve high metal recovery at low capital and operational costs. One of the major costs typically involved in a hydrometallurgical process is the consumption of leaching agents per ton of processed ore and per kilogram of final metal product. Leaching is not necessarily a very selective process and often part of the leaching agents is consumed by certain reactive compounds and impurities present in the ore besides the target metals, particularly in the case of acidic leaching and low grade ores. If the consumption of leaching agents is too high, then the overall process may become economically unattractive. This fact increasingly becomes more important with the current trend of diminishing ore grades. The dissolution of other impurities does not only affect economical parameters such as consumption of leaching agents, but may also present other technical and environmental issues required to be solved in the further process steps, affecting, for example, the quality of the final metal product.

In the hydrometallurgical copper production, for example, impurities like iron, manganese, magnesium, chlorine, arsenic, among others, may be transferred due to chemical and physical entrainments through solvent extraction to electrowinning, affecting the quality of copper cathodes.

Some leaching agents, such as ammonia, are considered as more selective towards target metals such as copper, nickel, cobalt and zinc, among others, and less selective towards impurities such as iron, aluminium, magnesium. However, the ammonia type leaching agents are rather more expensive and volatile, particularly at higher concentrations. For the economic viability of the overall process it becomes therefore necessary to minimise their consumption, particularly by avoiding high evaporation rates and by reducing the loss of unconsumed leaching agents to tailings and entrainments, e.g., by recycling them back to leaching.

An example of a leaching agent being recycled back to leaching is given in the U.S. Pat. No. 4,165,264 "Ammonia leaching" to Satchell, which proposes an improved process for obtaining copper from copper sulphide by leaching with an ammonium carbonate solution, oxygen and recycled gaseous ammonia and carbon dioxide. The proposed process is rather complex and requires the addition of oxygen to oxidise copper sulphide during leaching, the presence of several filtering steps, generating heat to form gaseous ammonia and carbon dioxide, the addition of a strongly alkaline material like gypsum in several parts of the process, and the elimination of ammonia before the electrolytic recovery of copper in an acid medium.

Techniques for agglomeration, curing and heap leaching of copper ores with sulphuric acid are disclosed in the Canadian patent No 1156049 "Copper leaching process" to Domic, which provides a process for recovering copper from copper ore by crushing the ore, wetting the crushed ore with separate additions of water and concentrated sulphuric acid, agglomerating the wetted ore to form lumps, aging the agglomerated ore for at least about three hours to indurate the agglomerate lumps and solubilise copper, percolating a leach liquid through a layer of aged ore, withdrawing a pregnant leach liquid from the bottom of the layer, and recovering copper from such pregnant leach liquid by solvent extraction or liquid ion exchange followed by cementation or electrowinning, or by direct electrowinning or direct cementation from the pregnant leach liquid. The patent discloses a process only for leaching copper ores with sulphuric acid, followed by traditional means of metal recovery.

More recently, some patents have been filed on curing ore with ammonia. The U.S. Pat. No. 8,388,729 "Method for ammoniacal leaching" to Welham, Johnston & Sutcliffe provides a method for leaching one or more target metals from an ore by curing the ore with an aqueous solution of a curing agent, leaching the cured ore at atmospheric pressure through the application of an ammonium carbonate solution containing free ammonia, and passing the resulting pregnant leach solution to a means for metal recovery. The U.S. Pat. No. 8,486,355 "Method for leaching cobalt from oxidised cobalt ores" to Sutcliffe, Johnston & Welham proposes a method for leaching cobalt from a non-lateritic oxidised cobalt ore by curing the ore with an aqueous solution of iron (II) salts, sulphite salts, sulphur dioxide, or combinations thereof, leaching the cured ore through the application of an ammonium carbonate solution containing free ammonia, and then passing the resulting pregnant leach solution to a means for cobalt recovery. Both patents of these inventors disclose methods only for ammoniacal leaching of one or more target metals, whereby the resulting pregnant leach solution is afterwards passed to some traditional means of metal recovery like solvent extraction, ion exchange, precipitation or cementation.

The patents above consider different leaching methods and are not related specifically to sorption methods with (solid) sorbents. Particularly, they consider neither the option of having a sorbent present during the leaching stage so as to perform simultaneous sorption leaching nor the use of a sorbent later on in the process to recycle leaching agents or residual target metals back to leaching.

The last decades have seen many advances in sorption technologies for metal concentration and purification in extractive metallurgy, allowing the extraction of metals and impurities not only from solutions but also from pulps (slurries), with no need of costly solid-liquid separation for the latter. In the case of extracting from a solution the process is called in general sorbent-in-solution (SIS), whereas in the case of extracting from a pulp it is called respectively sorbent-in-pulp (SIP) or sorbent-in-leach (SIL), depending on whether the pulp is contacted with the sorbent after the addition of the leaching agents or together with them. Usually, the name of these processes makes reference to the specific sorbent involved, typically an ion exchange resin or activated carbon. In the case of an ion exchange resin the processes are respectively called resin-in-solution (RIS), resin-in-pulp (RIP), and resin-in-leach (RIL), whereas in the case of activated carbon the processes are respectively known as carbon-in-solution (CIS), carbon-in-pulp (CIP), and carbon-in-leach (CIL). Sorbent-in-solution (SIS) can be applied to the pregnant leach solution after the leaching step or to some other solution from which certain dissolved species are to be extracted or removed, and is often implemented by a series of columns containing the sorbent through which the solution flows in an upwards direction, in which case the process is called sorbent-in-column (SIC), and specifically resin-in-column (MC) or carbon-in-column (CIC) when the sorbent is respectively an ion exchange resin or activated carbon. In sorbent-in-pulp (SIP) the sorption by the sorbent may start before pulp leaching is finished, whereas in sorbent-in-leach (SIL) the sorption by the sorbent is performed simultaneously with pulp leaching. Both processes, SIP and SIL, are typically performed in a series of agitated tanks (or vessels) where a coarse-sized granular sorbent and a finely ground ore slurry are contacted in a staged counter-current manner, separating after each stage the sorbent from the slurry by screening. All three processes (SIS, SIP and SIL) require afterwards an elution or desorption process to extract the target metals or species from the loaded sorbent to an aqueous solution (typically in one or more columns), which is then treated by further traditional separation or recovery processes like electrowinning, precipitation (cementation/crystallisation), among others.

Examples of RIS and RIP processes are disclosed in the US patent application N° 2011/0030508 "Process for metal separation using resin-in-pulp or resin-in-solution processes" from Dreisinger, MacDonald & Shaw, in the U.S. Pat. No. 6,350,420 "Resin-in-pulp method for recovery of nickel and cobalt" to Duyvesteyn, Neudorf & Weenink, and in the U.S. Pat. No. 6,344,068 "Process for recovering gold from thiosulfate leach solutions and slurries with ion exchange resin" to Fleming, Wells & Thomas. These patents disclose processes for treating solutions or slurries containing dissolved metals by loading the metals onto an ion exchange resin, having in common that leaching is performed preferably before contacting the solution or slurry with the ion exchange resin and not simultaneously.

Improvements on CIP and CIL processes are disclosed in the U.S. Pat. No. 4,816,234 "Utilization of oxygen in leaching and/or recovery procedures employing carbon" to Brison, Elmore & Mitchell, and in the U.S. Pat. No. 5,288,302 "Method and apparatus for extraction of metal values from metal bearing ores" to Hallinan, whereby gaseous or liquid agents, e.g., oxygen gas, are added during or before the CIP or CIL process. The U.S. Pat. No. 4,778,519 "Recovery of precious metals from a thiourea leach" to Pesic discloses a method for desorbing precious metals, such as gold and silver, from activated carbon loaded from thiourea leach solutions by means of a CIL or CIP process. These patents relate to processes whereby metals dissolved in a leaching pulp are loaded onto activated carbon, followed by an elution step.

The U.S. Pat. No. 7,901,484 "Resin-in-leach process to recover nickel and/or cobalt in ore leaching pulps" to Mendes provides a RIL process for directly recovering nickel, cobalt, or both, whereby pulp leaching with the addition of an acid or base dissolves the metals of interest, adsorbing simultaneously the metals rendered soluble onto an ionic exchange resin. Following elution of the charged resin, purification of nickel and cobalt present in the eluate can be recovered by conventional methods, such as precipitation, solvent extraction and membranes. The patent discloses a RIL process for nickel or cobalt recovery wherein the leaching agents (sulphuric, hydrochloric or nitric acid, or ammonia) are added simultaneously with the resin to a pulp, preferably under atmospheric conditions and in stirred vats.

The U.S. Pat. No. 4,723,998 "Recovery of gold from carbonaceous ores by simultaneous chlorine leach and ion exchange resin adsorption process" to O'Neil provides a gold recovery process in which the gold content of ores is extracted by a simultaneous chlorine leach and ion exchange resin adsorption procedure. The patent discloses a RIL process for gold recovery from a ground refractory carbonaceous ore that is slurried with water, wherein mixing tanks or chlorination vessels are used to agitate the mixture of slurry, resin and chlorine providing compounds, and wherein the resins flow preferably counter-current to the ore flow.

As can be appreciated in the previous patents, metal extraction by sorption is performed either from a solution or from a pulp (slurry), after or during leaching. In the case of sorption from a pulp, usually some sort of agitation leaching is involved. In particular, in the prior art no reference could be found that relates to the claimed novelty of the present invention, namely to a simultaneous sorption leaching in the state of wet solids. Likewise, no mention was found to a process for metal extraction using a sorbent to scavenge or recycle leaching agents back to leaching, to diminish the overall leaching agent consumption of the process, as disclosed in the present invention. One objective of the present invention is to overcome drawbacks associated with the prior art, or to at least provide a useful alternative thereto.

SUMMARY OF THE INVENTION

The present invention discloses a hydrometallurgical process for the selective extraction of one or more target metals from ore, concentrates, tailings, slags or other metal bearing solids, by combining simultaneously leaching with sorption in the state of wet solids. The sorption is performed by means of sorbents such as ion exchange resins (polymers), activated carbon, zeolites, among others, and mixtures thereof. In one embodiment of the invention, the process comprises the steps of: (a) blending the metal bearing solids with acidic or basic leaching agents, one or more sorbents, and a sufficient amount of an aqueous solution to wet substantially both the metal bearing solids and the sorbent without formation of a slurry, thereby obtaining wet solids; (b) performing sorption leaching in wet solids; (c) diluting the wet solids and preparing a pulp by adding an aqueous solution; (d) separating the loaded sorbent from the pulp; (e) eluting (desorbing) target metals from the loaded sorbent with an eluent to an eluate, returning thereafter the sorbent back to the blending step (a); and (f) recovering target metals from the eluate to obtain one or more final metal products, returning the eluent back to the elution step (e). The pulp, after the separation step (d), is sent either directly to waste disposal or to further downstream processing to recover other species of interest or to remove impurities.

In another embodiment of the invention, the process further comprises a step of scrubbing the loaded sorbent with an aqueous solution after the separation step (d) and before the elution step (e). The resulting scrubbing solution, which may contain leaching agents, impurities, or both, is returned back to the blending step (a). Alternatively, the scrubbing solution, or part of it, may also be returned to the dilution step (c).

In yet another embodiment of the invention, the process further comprises a step of scavenging the pulp after the separation step (d) with the eluted sorbent from the elution step (e), followed by another separation (II) of sorbent from pulp step. The sorbent, which may be loaded with leaching agents, target metals, or both, is then returned back to the blending step (a).

The main claimed novelties of the present invention involve the sorption leaching in wet solids step (b) together with the previously required blending in wet solids step (a) and the following dilution and pulp preparation step (c), as well as the optional scrubbing and scavenging steps, whereas the separation step (d), the elution step (e), the metal recovery step (f), and the optional separation (II) step correspond to rather conventional techniques from the prior art.

Among the major advantages of the present invention are: (i) The processes of sorption and leaching are performed simultaneously, which reduces the required number of process stages in comparison to conventional technologies. (ii) Performing the sorption leaching in wet solids enables a significant increase in the concentration of leaching agents in relation to target metal(s) content in solids, at the same addition rate of said leaching agents. This improves thermodynamic conditions and leaching kinetics for dissolving target metal(s). Simultaneously, equilibrium conditions and sorption kinetics for loading metal(s) into the sorbent are improved, as higher concentrations of dissolved metal(s) are readily available. (iii) In comparison to traditional sorbent-in-pulp (SIP), sorbent-in-leach (SIL) and sorbent-in-solution (SIS), implementing sorption leaching in wet solids whereby the metal bearing solids and the sorbent are kept in a settled status with respect to the liquid phase avoids sorbent attrition or breakdown as well as energy consumption associated with material handling and transportation during this step, while allowing at the same time sorption and leaching to take place. (iv) The use of a dilution and pulp preparation step after the sorption leaching in wet solids has the advantage of reducing the concentration of remaining target metal(s) and leaching agents in the solution of the waste pulp, improving thus metal recovery and reducing leaching agent(s) consumption. (v) The implementation of a scrubbing step for the loaded sorbent after separating sorbent from pulp allows the removal of impurities from the sorbent and recycle them back to blending or to dilution and pulp preparation, to enhance their disposal in the waste pulp. The scrubbing step allows also the removal of entrained solids, solution or slurry attached to the sorbent when the elution step has to be shielded from said entrained compounds, e.g., when elution is carried out in acid media while sorption leaching is implemented in basic media. (vi) The use of a scavenging step enables the recovery of residual target metal(s) present in the barren pulp with the eluted sorbent, and to recycle said metal(s) back to the blending step. In a similar manner as with the scrubbing step, the scavenging step allows also to remove entrained solution attached to the sorbent, shielding the blending step when the elution is carried out using different media as the sorption leaching (e.g., acid versus basic media).

When one or more of the involved sorbents is not only selective for target metal(s) but is also able to load leaching agents (e.g., a general purpose ion exchange resin like a strong acid cation resin), then said sorbent(s) can be recycled back to the initial blending step, loaded with leaching agents from either the scavenging or the elution step, depending on the embodiment of the invention. If this is the case, the invention possesses the following advantages in addition: (vii) Introducing a sorbent loaded with leaching agents in the initial step of blending in wet solids increases the availability of leaching agents in the same measure as the sorbent is loaded with target metal(s) during the sorption leaching step, ensuring a regular presence of said leaching agents as they are consumed in the leaching process. Furthermore, when the leaching agents are subject to an increased evaporation rate at higher concentrations, as for example in the case of ammonia, it allows keeping a reduced evaporation rate of said leaching agents during the sorption leaching step. (viii) The combined effect of introducing a sorbent loaded with leaching agent(s) in the blending step and performing the sorption leaching in wet solids increases simultaneously the availability in time and the concentration of the leaching agents, enabling both a more efficient sorption and leaching from the point of view of residence time, consumption of leaching agents and metal loading on the sorbent. (ix) In comparison to traditional agglomeration, curing and heap leaching, the presence of a sorbent during leaching improves metal recovery, as it supplies a regular presence of additional leaching agents and reduces their consumption, and does not require further concentration/purification steps, since the sorbent is loaded during sorption leaching. (x) The use of a scavenging step enables the recycling of remaining leaching agents from the final pulp back to blending (after a sorbent from pulp separation step) by means of the sorbent and enables the availability of leaching agents in the sorption leaching step, diminishing thus the overall consumption of leaching agents in the process by reducing their content in the waste pulp. (xi) The implementation of a scrubbing step permits the removal of leaching agents from the loaded sorbent(s) after separation from the pulp, recycling the leaching agents back to blending through a scrubbing solution, or alternatively to dilution and pulp preparation, avoiding their transfer to the elution step.

All the above advantages result in the reduction of capital and operating costs with respect to the prior art, allowing an efficient and economic hydrometallurgical process for the extraction of target metal(s) from ore, tailings, slags or other metal bearing solids. In the particular case of using ammonia and ammonium salts as leaching agents, the process has the advantage of extracting target metal(s) from high acid consuming metal bearing solids in a cost effective way, which is particularly well suited for processing ore and tailings that require high acid consumption.

These and other objectives, advantages, and features of the present invention are disclosed more thoroughly in the detailed description of the invention.

DETAILED DESCRIPTION OF THE INVENTION

Figure 1:
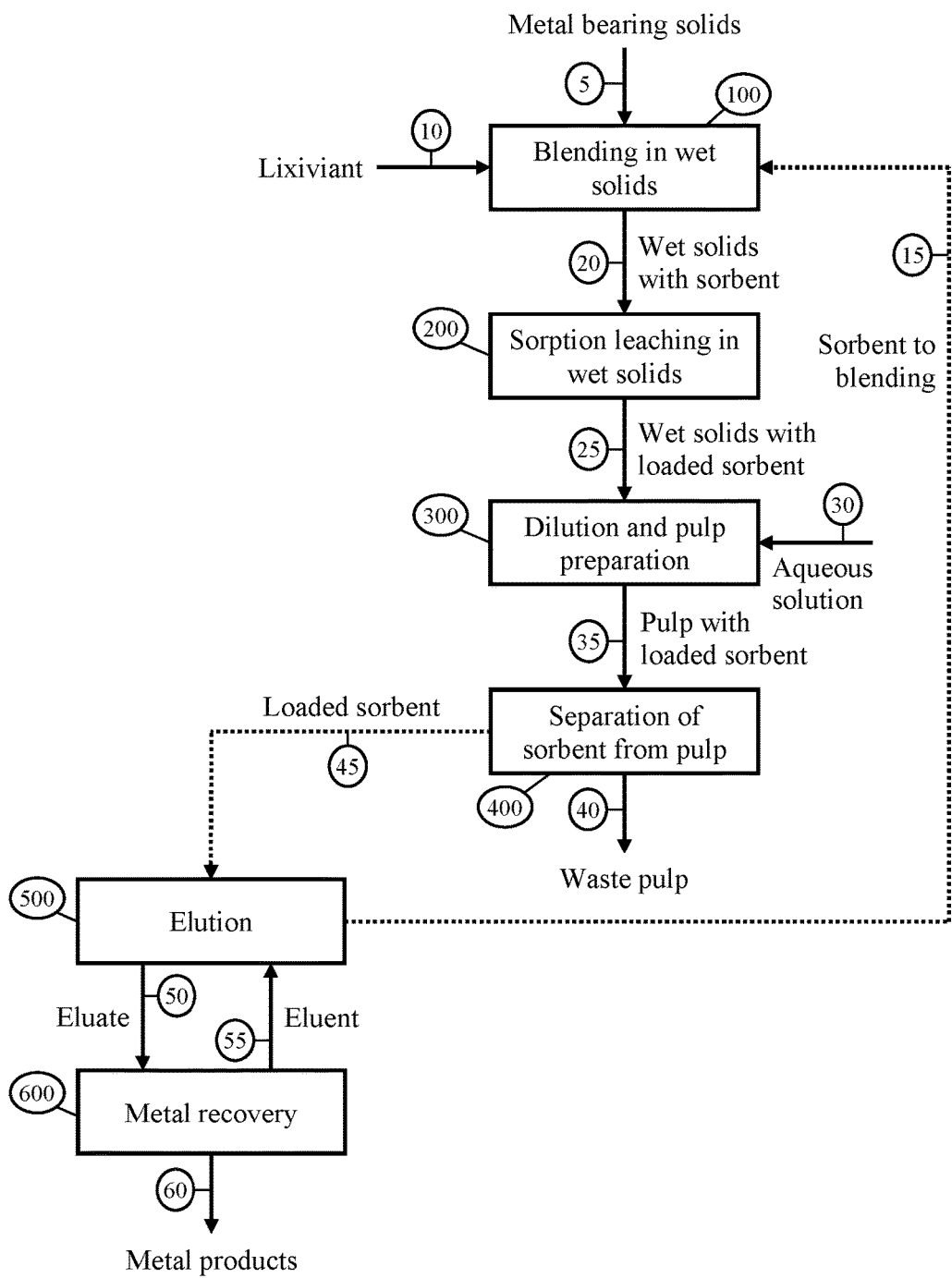
FIG. 1 is a process flow sheet for one embodiment of the invention, showing the steps of blending in wet solids, sorption leaching in wet solids, dilution and pulp preparation, separation of sorbent from pulp, elution, and metal recovery.

The present invention discloses a hydrometallurgical process for the selective extraction of one or more target metals from ore, concentrates, tailings, slags or other metal bearing solids, by combining simultaneously leaching with sorption in the state of wet solids.

Target metals may include, but are not limited to, copper (Cu), nickel (Ni), cobalt (Co), zinc (Zn), silver (Ag), gold (Au), platinum (Pt), palladium (Pd), rhodium (Rh), mercury (Hg), chromium (Cr), cadmium (Cd), molybdenum (Mo), rhenium (Re), and uranium (U), among others.

Leaching is performed by means of a lixiviant or leach solution, which comprises an aqueous solution and leaching agents. The aqueous solution and the individual leaching agents may be added separately or together. The leaching agents comprise at least one element selected from the group consisting of, but not limited to, sulphuric acid, hydrochloric acid, nitric acid, phosphoric acid, carbonic acid, citric acid, acetic acid, oxalic acid, formic acid, ammonia, cyanide, urea, thiourea, thiosulphate, among others, and mixtures thereof. The leaching agents may also include salts such as sulphates (e.g., sodium sulphate, potassium sulphate, calcium sulphate, magnesium sulphate, etc.), chlorides (e.g., sodium chloride, potassium chloride, calcium chloride, magnesium chloride, etc.), nitrates (e.g., sodium nitrate, potassium nitrate, calcium nitrate, ferric nitrate, etc.), phosphates (e.g., sodium phosphate, potassium phosphate, calcium phosphate, etc.), carbonates (e.g., sodium carbonate, potassium carbonate, etc.), ammonium salts (e.g., ammonium carbonate, ammonium sulphate, ammonium chloride, ammonium nitrate, etc.), hydroxides (e.g., sodium hydroxide, potassium hydroxide, ammonium hydroxide, etc.), acetates (e.g., sodium acetate, potassium acetate, ammonium acetate, etc.), oxalates (e.g., sodium oxalate, potassium ferrioxalate, magnesium oxalate, calcium oxalate, etc.), cyanides (e.g., sodium cyanide, potassium cyanide, etc.), formates (e.g., sodium formate, potassium formate, etc.), citrates (e.g., sodium citrate, calcium citrate, etc.), hypochlorites (e.g., sodium hypochlorite, potassium hypochlorite, etc.), bromides (e.g., sodium bromide, potassium bromide, etc.), among others, and combinations thereof. Additionally, leaching agents may include also oxidising or reducing agents like oxygen, air, chlorine, hydrogen peroxide, calcium peroxide, manganese dioxide, ferric nitrate, sulphur dioxide, hydrogen sulphide, ferric chloride, magnesium oxide, sodium hypochlorite, elemental iron, elemental aluminium, elemental magnesium, elemental zinc, scrap metals, among others, and combinations thereof.

Sorption is performed by means of one or more (solid) sorbents such as ion exchange resins, activated carbon, zeolites, among others, and mixtures thereof.

Ion exchange resins are synthetic materials formed by an insoluble organic polymer matrix (usually polystyrene, phenolic or acrylic copolymers cross-linked with divinylbenzene) and one or more functional (or ionogenic) groups attached thereto, which act as a fixed ion and determine the chemical behaviour of the resin. Ion exchange resins are classified as cation exchangers (able to exchange positively charged counter-ions), anion exchangers (able to exchange negatively charged counter-ions), and amphoteric exchangers (able to exchange as much cations as anions, achievable also by a mixed bed of cation and anion exchangers). Ion exchange resins are broadly further classified as strong or weak acid cation resins (behave respectively like a strong or weak acid), strong or weak base anion resins (behave respectively like a strong or weak base), and chelating resins (highly selective for specific counter-ions). Strong acid cation (SAC) resins typically derive their functionality from sulphonic acid ($SO_3^-$) groups, being commercially available in hydrogen ($H^+$) or sodium ($Na^+$) ionic form. Weak acid cation (WAC) resins typically have carboxylic ($COO^-$) functional groups, being commercially available in hydrogen ($H^+$) or sodium ($Na^+$) form. Strong base anion (SBA) resins typically derive their functionality from quaternary amine groups (e.g., trimethylamine for Type 1 resins and dimethylethanolamine for Type 2 resins), being commercially available in hydroxide ($OH^-$) or chloride ($Cl^-$) form. Weak base anion (WBA) resins typically contain polyamine functional groups (e.g., polyethylene amine), being commercially available in free base form or in chloride ($Cl^-$) form. Common chelating resins have iminodiacetic, aminophosphonic, thiouronium, thiourea, thiol, thiocarbamide, N-methylglucamine, benzyltriethylammonium, amidoxime, phenolic, phenol-methylenesulfonate, 2-picolylamine, ethylenediaminetetraacetic, and related functional groups, among many others, being commercially available in hydrogen ($H^+$), sodium ($Na^+$), free base or other forms. Chelating resins exist for the selective recovery of copper, nickel, cobalt, zinc, silver, gold, platinum, palladium, mercury, and lead, among many others. Ion exchange resins are manufactured into one of two physical structures, gel or macroporous, and in the latter case they are commonly shaped either as small beads (0.3 to 2 mm diameter) or as membranes. The sorbent may comprise but is not limited to SAC, WAC, SBA, WBA, chelating, or other ion exchange resins, and mixtures thereof, in any of their ionic forms and particle size distributions, preferably in the form of macroporous beads.

Activated carbon, also known as activated charcoal or carbo activatus, is a form of carbon prepared in such a way so as to exhibit a high degree of porosity and an extended surface area. Activated carbon is usually produced from high carbon bearing raw materials such as nutshells, coconut shells, wood, peat, lignite, coal, and petroleum pitch, among others, by a process that comprises carbonisation and activation, either physically or chemically, which removes non-carbon impurities and oxidises the surface. Activated carbon performance can be further enhanced by use of catalysts as well as by treating the carbon with various chemical solutions to fine tune the adsorption characteristics. Activated carbon has typically a high adsorptive surface area (500-1500 $m^2\,g^{-1}$), while the pore volume ranges usually between 0.7 and 1.8 $cm^3\,g^{-1}$. It is mainly used in the form of powdered activated carbon (PAC) or granular activated carbon (GAC). GAC is usually in the form of crushed granules of coal or shell, but may also be prepared by granulation of pulverised powders using binders such as coal tar pitch. GAC particles typically have sizes ranging from 0.2 to 5 mm. The sorbent may comprise activated carbon, in any shape and size distribution, preferably in granular form.

Zeolites are microporous, aluminosilicate minerals, with a structure of interlocking three-dimensional frameworks of $SiO_4$ and $AlO_4$ tetrahedra, which act as molecular sieves due to their very regular pore structure of molecular dimensions. Zeolites are commonly used as commercial adsorbents, ion exchangers and catalysts. Zeolites occur naturally but are also produced synthetically on a large industrial scale. The term zeolite includes natural silicate zeolites, synthetic materials and phosphate minerals that have a zeolite like structure. Some more common zeolites are analcime, chabazite, clinoptilolite, erionite, faujasite, ferrierite, heulandite, mordenite, natrolite, phillipsite, sodalite, and stilbite, among others, together with synthetic zeolites like zeolites of type A, X, Y, L, ZSM-5, beta, MCM-22, F, and W, among others. For example, clinoptilolite is used in industry and academia due to its strong ion exchange affinity for ammonia ($NH_4^+$) and metals (e.g., Co, Cu, Zn, Fe, Mn). Zeolite particles are incorporated into a number of different engineered forms, including small spherical particles for fluidised bed applications and small granules for powdered detergents. Larger forms include extruded pellets with various cross-sectional shapes and beads made by bead-forming processes. The bonding forces that hold zeolite particles together are created by a high-temperature treatment of hydrated oxides and hydroxylated zeolite surfaces, using unit operations similar to those used in the ceramics industry, including extrusion, bead forming and slurry casting in cases where zeolite powders are coated on surfaces. Organic polymers and resins have also been used for zeolite binding, e.g., polyurethane, cellulose acetate and other cellulose-based polymers, latex, and more recently thermoplastic resins such as polyethylene. The sorbent may comprise any kind of zeolites in any shape and size, preferably in the form of beads or granules.

The sorbent is chosen preferably in the form of beads or granules in a polydisperse particle size distribution. The particle size of the sorbent is preferably greater than the particle size of the metal bearing solids, to achieve an effective separation of both. In one embodiment of the invention, the metal bearing solids have a particle size below 0.5 mm, preferably below 0.3 mm, and most preferably below 0.1 mm, while the particle size of the sorbent is greater than about 0.6 mm, preferably greater than about 0.8 mm.

The state of wet solids is characterised by a solid material that has been wetted or soaked by a liquid, i.e., a solid to which surface a liquid remains attached or adhered to, resulting from intermolecular interactions when the solid and the liquid are physically brought together. Wet solids, which may also be called moisturised solids, moist solids, soaked solids, moist mix, moisturised mix, wet mix, or soaked mix, correspond thus to a mixture of solid and liquid materials, where a significant amount of solids have liquid (i.e., moisture) adhered to their surface and where the solids broadly outweigh the liquids (in the sense of solids content or density). In contrast to a slurry or pulp, in wet solids the solids remain rather in a settled state and are not required to be maintained in suspension within the liquid. A certain amount of the liquid may even seep, percolate or flow through the solids. Also, wet solids are not required to be pumped or to flow far away under gravity. One of the main advantages of performing sorption leaching in the state of wet solids is that a substantial amount of the lixiviant remains in contact with the metal bearing solids and with the sorbent, while enabling a significant increase in the concentration of leaching agents in relation to the content of target metals in the solids.

Solid-liquid mixtures, particularly when referring to thickened tailings, are often classified on the basis of consistency (solids content or density) by the terms of slurry, paste and cake, according to increasing solids concentration and material strength (yield or shear stress). This terminology is rather arbitrary, as solid-liquid mixtures form a continuum in terms of solids content (from 0 to 100%). Jewell, Fourie & Lord (2002) propose to mark the transition between slurry and paste at a yield stress of around 200 Pa (measured with a vane-shear test at the point of discharge towards tailings), while defining subjectively the transition between paste and cake as the material changes from plastic behaviour to semi-solid behaviour. A slurry flows rather easily under gravity and can be typically pumped by conventional means such as centrifugal pumps. A paste denotes generally an ultra high-density solid-liquid mixture with low flow characteristics and high viscosity, which typically can only be pumped with sophisticated and expensive positive displacement (PD) pumps. A cake typically is too consistent to be pumped even by PD pumps. By considering the previous terminology, the state of wet solids is characterised rather as a paste or a cake, although it does not require the solids to be of small particle size or even in powdered form.

According to The Hydraulic Institute (2006), regarding the American National Standard ANSI/HI 12.1-12.6-2005, "a slurry is a mixture of solids (specific gravity greater than 1.0) in a liquid carrier, usually water. It is often used as a means to transport solids. Slurries also occur when solids are present as an incidental part of the process. The properties of the solids and liquid, as well as the amount of solids, are variable. The solids size may vary from a few micrometers, often referred to as microns, up to hundreds of millimeters and the solids may settle below a certain transport velocity. The properties of slurry, therefore, are highly variable. Slurry may behave like a Newtonian or non-Newtonian fluid. It may be abrasive and/or corrosive depending on the composition. Slurry pumps are usually employed to move slurries with solids concentrations between 2 percent and 50 percent by volume, and specific gravities of the slurry up to 5.3."

For the sake of the present invention, the state of wet solids is roughly characterised as having a sufficient amount of liquid (lixiviant) to wet substantially the solid materials (both the metal bearing solids and the sorbent) without formation of a slurry. In a more quantitative manner, the state of wet solids is characterised by possessing a moisture (liquid) content by weight (on dry basis) in the range between 2 and 30 percent per dry weight of solids, preferably between 6 and 25 percent per dry weight of solids, and most preferably between 8 and 20 percent per dry weight of solids. Equivalently, the state of wet solids is characterised by possessing the solids content by weight (percent solids) in the range between 76.9% and 98.0%, preferably between 80.0% and 94.3%, and most preferably between 83.3% and 92.6%. The moisture content includes the amount of liquid (lixiviant) able to effectively wet the solids (metal bearing solids, sorbent), in the sense of maintaining contact with the external surface of the solids, but excludes liquids (lixiviant, water) entrapped or contained within the solids, e.g., water contained in mineral structures of the metal bearing solids (water of hydration, water of crystallisation) or water content of the sorbent (swelling water, water regain). Some minerals, e.g., certain clays, may contain up to 40% water content by weight without displaying wetness signs, and some sorbents, e.g., certain strong acid cation resins, contain about 50% water content within the resin beads due to their porosity. On the other hand, wetting substantially the solids is understood in the sense of maintaining a significant amount (economically acceptable) of the surface of the solids (metal bearing solids, sorbent) in contact with the liquid (lixiviant). Substantial wetting can be checked, e.g., by visual inspection with the glove test, whereby the solids are deemed to be wet enough as liquid begins to seep through them when pressed with a gloved hand.

The metal bearing solids may comprise ore, concentrates, tailings, slags, wastes or any other solid material containing one or more target metals. The metal bearing solids may even be wet or soaked. The moisture content of the metal bearing solids is also taken into account for the quantitative characterisation of the state of wet solids. Before performing sorption leaching in wet solids, the metal bearing solids may be subjected to other process steps, which may include comminution (e.g., crushing, grinding, etc.), separation/concentration (e.g., screening, sieving, by gravity, magnetic, etc.), drying, roasting, oxidation (e.g., with ferric compounds, hypochlorites, chlorites, chlorates, perchlorates, chlorine, peroxides, air, oxygen, ozone, nitrates, manganates, permanganates, manganese dioxide, etc.), reduction (e.g., with sulphites, sulphur dioxide, phosphites, hypophosphites, scrap metals, etc.), leaching, among many others.

In one embodiment of the invention, shown in FIG. 1, the process comprises a step of blending (100) the metal bearing solids (5) with one or more sorbents (15) and a lixiviant (10) that includes acidic or basic leaching agents and a sufficient amount of an aqueous solution to wet substantially both the metal bearing solids and the sorbent without formation of a slurry, thereby obtaining wet solids (20), blended with the sorbent. After the blending step (100), sorption leaching (200) is performed in the state of wet solids, whereby target metal(s) are dissolved into the aqueous phase and are simultaneously sorbed by the sorbent, thus obtaining wet solids (25) together with a sorbent loaded with target metal(s). The sorption leaching step (200) is followed by a dilution and pulp preparation step (300), whereby a sufficient amount of an aqueous solution (30) is added to the wet solids with the loaded sorbent (25) so as to form a pulp or slurry (35), containing the loaded sorbent. After the dilution and pulp preparation step (300), the pulp with the loaded sorbent (35) is subjected to a separation step (400), whereby the loaded sorbent (45) is separated from the pulp (40). The pulp (40), after the separation step (400), is sent either to waste disposal or to further processing to recover other species of interest or to remove impurities. The loaded sorbent (45) from the separation step (400) is then subjected to an elution or desorption step (500), whereby the loaded sorbent (45) is contacted with an aqueous solution called eluent (55) into which target metal(s) are desorbed or eluted from the loaded sorbent (45), obtaining an aqueous solution with an increased amount of dissolved target metal(s) called eluate (50) and returning the eluted sorbent (15) back to the blending step (100), after separating the eluted sorbent (15)

from the eluate (50). Target metal(s) are then recovered in the form of one or more metal products (60) from the eluate (50) by a metal recovery step (600), and the resulting eluent (55), with a decreased amount of dissolved target metal(s), is returned back to the elution step (500).

Figure 2:
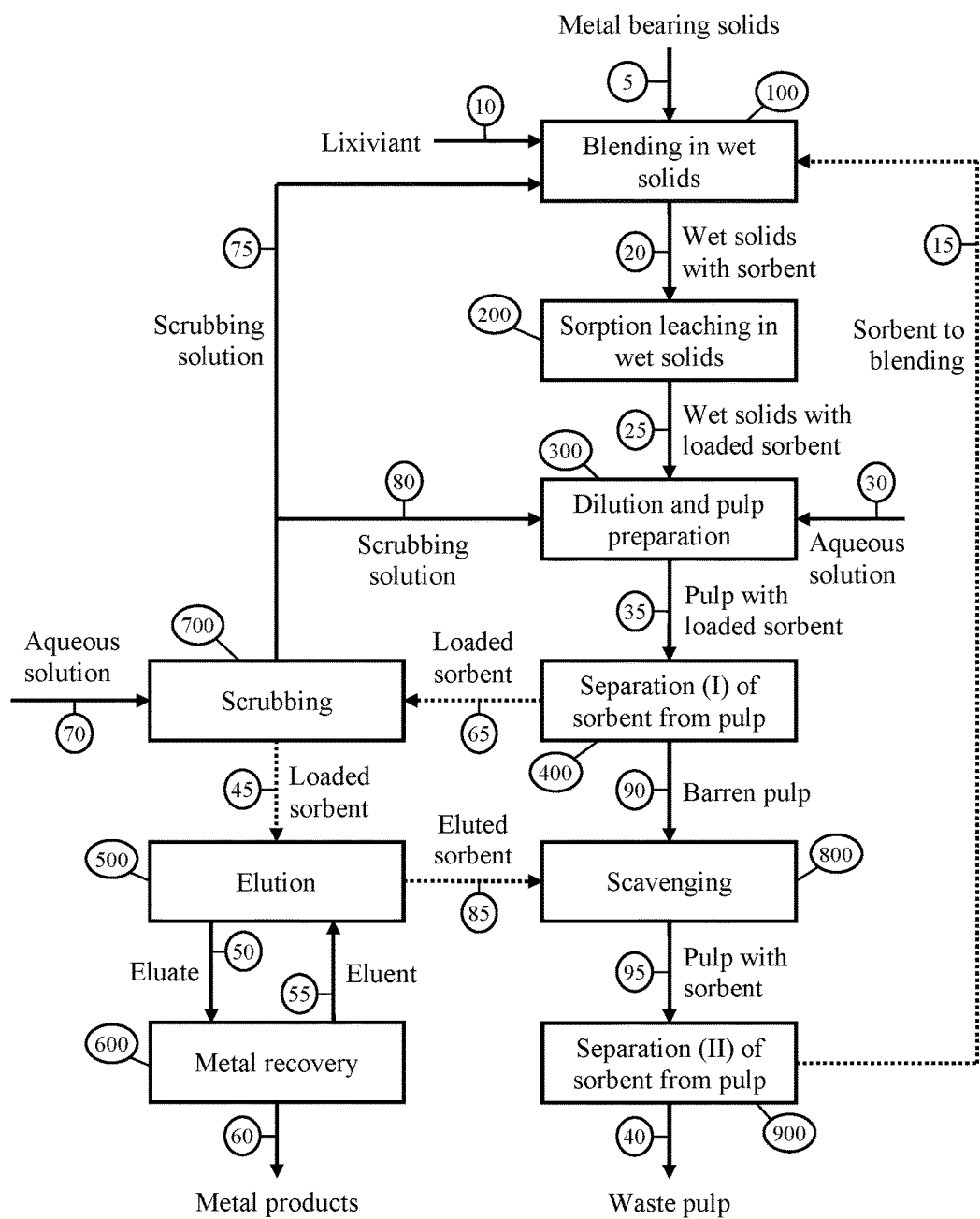
FIG. 2 is a process flow sheet for another embodiment of the invention, showing the steps of blending in wet solids, sorption leaching in wet solids, dilution and pulp preparation, separation (I) of sorbent from pulp, scrubbing, elution, scavenging, separation (II) of sorbent from pulp, and metal recovery.

In another embodiment of the invention, as shown in FIG. 2, the loaded sorbent (45) prior to the elution step (500) is subjected to a scrubbing step (700) to remove (or desorb) undesired impurities, to recover (or desorb) leaching agents, or both, whereby the loaded sorbent (65) from the separation step (400) is contacted with an aqueous solution (70). The resulting scrubbing solution (75) with dissolved impurities, leaching agents, or both, is returned back to the blending step (100). In other embodiments of the invention the scrubbing solution (80), or part of it, is returned to the dilution and pulp preparation step (300). In yet other embodiments, the scrubbing solution, or part of it, may be sent to the waste pulp or to other process steps. In even other embodiments, more than one scrubbing steps may be implemented, each with its corresponding aqueous solution.

In yet another embodiment of the invention, as shown in FIG. 2, prior to sending the pulp (40) to waste disposal and prior to returning the sorbent (15) back to the blending step (100), the pulp and sorbent are subjected to a scavenging step (800) followed by a separation (II) of sorbent from pulp step (900). In the scavenging step (800) the eluted sorbent (85) from the elution step (500) is contacted with the barren pulp (90) from the separation (I) of sorbent from pulp step (400), whereby remaining leaching agents, residual target metal(s), or both, are scavenged or recovered by sorbing them onto the sorbent. The resulting pulp with sorbent (95) from the scavenging step (800) is then subjected to a separation (II) step (900), whereby the waste pulp (40) is separated from the sorbent (15), being the sorbent (15) returned back to the blending step (100) and the waste pulp (40) sent to waste disposal or to further processing.

Figure 3:
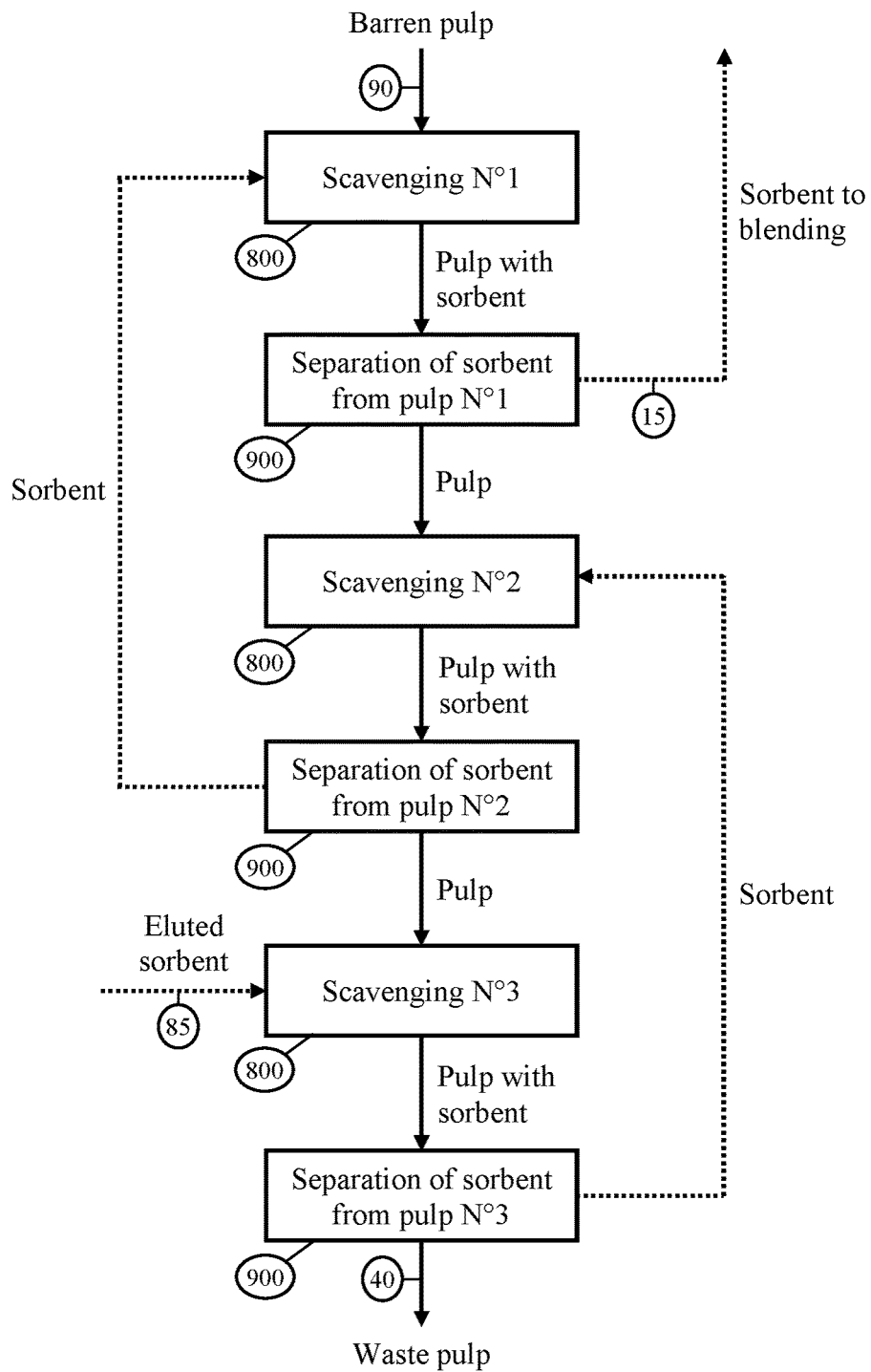
FIG. 3 is a process flow sheet showing a counter current configuration of three scavenging steps followed each by a sorbent from pulp separation step, as an example for yet another embodiment of the invention.

In other embodiments of the invention, several groups of scavenging steps (800) followed by separation of sorbent from pulp steps (900) may be implemented, preferably transferring the pulp and the sorbent in counter current manner between the scavenging steps (separating sorbent from pulp after each step), whereby the eluted sorbent (85) first contacts the pulp with least remaining leaching agents content, residual target metal(s) content, or both, in the last step prior to waste disposal, following in order by increasingly more loaded sorbent and pulp of higher content (with remaining leaching agents content, residual target metal(s) content, or both), until contacting in the first scavenging step the barren pulp (90) from the separation (I) of sorbent from pulp step (400) with the most loaded sorbent (with remaining leaching agents content, residual target metal(s) content, or both), and returning this sorbent (15) after separating it from the pulp back to the blending step (100). An example of such a counter current configuration with 3 scavenging steps followed each by its corresponding separation step is shown in FIG. 3. Further leaching agents (including oxidising or reducing agents) may be added to any of the scavenging steps. The number of scavenging steps followed each by a separation of sorbent from pulp step is preferably in the range from 1 to 7. These scavenging steps are based on the sorbent in pulp (SIP) process and play a supplementary role in the whole process aiming at increasing the extraction rate of target metal(s) and decreasing the consumption of leaching agents.

In yet other embodiments of the invention, after the dilution and pulp preparation step (300) or after the separation of sorbent from pulp step (400) one or more conventional sorbent in pulp (SIP) steps, followed each by a separation of sorbent from pulp step (400), can be implemented to continue sorption leaching of residual target metal(s) present in the pulp, whereby the sorbent and the pulp are moved preferably in a counter current manner between the SIP steps (separating sorbent from pulp after each step), i.e., first contacting the most loaded sorbent with the pulp of higher target metal(s) content, followed in order by decreasingly less loaded sorbents and pulp of lower target metal(s) content, such that the loaded sorbent from the separation step (400) is contacted with the last SIP step having the pulp with the lowest target metal(s) content. The most loaded sorbent is then sent either to the scrubbing step (700) or directly to the elution step (500). The pulp with least target metal(s) content is then sent either to the scavenging step (800) or to a waste dam (40). Additionally, leaching agents (including oxidising or reducing agents) may be added to any of the SIP steps. The number of the SIP steps followed each by a separation of sorbent from pulp step is preferably in the range from 1 to 7.

In even other embodiments of the invention, after the separation of sorbent from pulp step (400) one or more conventional thickening steps can be implemented, preferably in the form of a counter current decantation (CCD) circuit, whereby an aqueous solution flows in counter current manner with respect to the pulp. The scrubbing solution from the scrubbing step (700), or part of it, may be used as the aqueous solution. Additionally, leaching agents (including oxidising or reducing agents) may be added to any of the thickening steps. The number of thickening steps is preferably in the range from 1 to 7.

In even yet other embodiments of the invention, after any one of the separation of sorbent from pulp steps (400) and (900), as well as after the elution step (500), the sorbent may be washed with an aqueous solution, preferably with water, to remove entrained solids, solution or pulp prior to the following step.

The blending step (100) involves blending the metal bearing solids (5) with one or more sorbents (15) and a lixiviant (10) containing acidic or basic leaching agents and an aqueous solution so as to form wet solids (20). More in general, blending involves just preparing a wet solids mixture (20) by contacting the metal bearing solids (5), the sorbent (15), and the lixiviant (10). Blending may be performed under static or dynamic conditions, and may include mixing, gyration, rotation, agitation, vibration, shaking, among others. Some solids (either the metal bearing solids or the sorbent) may even remain in a settled or relatively settled state while being contacted with the lixiviant (10) and with the other solids (respectively the sorbent or the metal bearing solids). Blending (100) is implemented preferably so as to wet the solids (metal bearing solids, sorbent) in a uniform manner. Certain sorbents (e.g., some ion exchange resins) may deteriorate significantly when being contacted directly with certain leaching agents (e.g., acid) in high concentration. For these cases it becomes recommendable to blend first the metal bearing solids (5) with the lixiviant (10) and shortly thereafter (at most about some seconds, preferably not over a minute) with the sorbent (15). In other cases the blending can be performed simultaneously. The residence time in the blending step (100) is chosen preferably below 1 hour, and most preferably below 5 minutes. The blending step (100) is performed preferably either in an agglomeration drum, a drum mixer, a pelletising disk, a tank, a vessel, or a conveyor belt.

The sorption leaching step (200) is performed in the state of wet solids, whereby sorption and leaching of target metal(s) take place simultaneously. Sorption leaching may be performed by maintaining the solids in a settled state (i.e., under static conditions), under vibration, or relatively settled inside (and with respect to) some means of transportation (e.g., a conveyor belt or a hopper of a truck). Solutions seeping or percolating through the wet solids may be recycled back to the top of the wet solids. In some embodiments additional leaching agents may be added during this step, including oxidising or reducing agents, preferably in gaseous phase (e.g., oxygen, air, sulphur dioxide, ammonia). The residence time in the sorption leaching step (200) is chosen in the range between 10 minutes and 120 hours, preferably between 1 hour and 24 hours, and most preferably between 3 and 6 hours. The sorption leaching step (200) is performed preferably either in a tank, a vessel, a pond, a pile, a heap, a dump, a conveyor belt, or a hopper.

The dilution and pulp preparation step (300) involves adding enough amount of an aqueous solution (30) to the wet solids with the loaded sorbent (25) from the sorption leaching step (200) so as to form a pulp or slurry (35). The aqueous solution (30) may comprise water, scrubbing solution (80) from the scrubbing step (700), or another aqueous solution with or without leaching agents. The amount of aqueous solution (30) is measured in such a way so as to form the pulp (35) with a content of solids in the range of 5 to 70 percent weight of the pulp, preferably in the range of 25 to 60 percent weight of the pulp, and more preferably in the range of 35 to 55 percent weight of the pulp. The dilution and pulp preparation (300) involves preferably either mechanical stirring, air assisted (pneumatic) stirring (e.g., Pachuca tanks), or hydraulic mining (e.g., using a monitor to deliver pressurised water jets through a nozzle). The dilution and pulp preparation step (300) is performed preferably either in a tank, a vessel, a pond, a pile, a heap, or a dump.

The separation of sorbent from pulp steps (400) and (900) involve the physical separation of the sorbent from the pulp and are performed rather by conventional separation means such as mechanical screening, which may comprise separating by size, shape, or density using screens with openings or slots, vibration, gravity, gyration, rotation, drums, shakers, among others. The separation is preferably performed by size using one or more screens with openings or slots, or one or more horizontal static or vibrating sieves.

The elution (or desorption) step (500) involves contacting the loaded sorbent (45) with the eluent (55), thereby obtaining, after separating the solution from the sorbent, the eluate (50) and the eluted sorbent (85) (or (15), depending on the embodiment of the invention). The elution (500) is performed rather by conventional means, preferably by using one or more elution columns. Depending on the involved target metal(s), the eluent (55) comprises an acidic, neutral, or basic solution, being the involved acid or base selected from the group consisting of, but not limited to, sulphuric acid, hydrochloric acid, nitric acid, phosphoric acid, carbonic acid, citric acid, acetic acid, oxalic acid, formic acid, ammonia, cyanide, urea, thiourea, thiosulphate, among others, and mixtures thereof. The eluent (55) may also include salts and related compounds such as sulphates, chlorides, nitrates, phosphates, carbonates, ammonium salts, hydroxides, acetates, oxalates, cyanides, citrates, hypochlorites, bromides, among others, and combinations thereof.

The metal recovery step (600) involves recovering target metal(s) in the form of one or more metal products (60) from the eluate (50), returning thereafter the resulting eluent (55) back to the elution step (500). The metal recovery (600) is performed rather by conventional means and may comprise electrowinning, precipitation, cementation, crystallisation, evaporation, smelting, electrorefining, membranes, among others, and combinations thereof. For example, in the case of electrowinning the eluate (50) may be fed as the pregnant (or rich) electrolyte solution into the electrolytic cells, being thereafter the spent (or poor) electrolyte solution returned as the eluent (55), which is sent to the elution step (500). In addition, the metal recovery step (600) may comprise further processing steps to separate individual target metals from each other in case there is more than one of them. The metal products (60) are produced preferably in the form of metal cathodes, metal powder, metal oxides, metal sulphides, or other metal compounds (e.g., metal sulphates, chlorides, nitrates, carbonates, etc.), but may also comprise metal bearing concentrates, metal bearing solutions, metal bearing pulps, metal alloys, among others, and combinations thereof.

In some embodiments of the invention, the separation of individual target metals can be performed by means of several elution columns in the elution step (600), whereby each elution column is contacted with a different eluent (55), typically with a different pH level in each elution column, and yields a corresponding eluate (50), which is sent to an associated metal recovery step (600) for recovering the specific individual target metal.

The sorbent scrubbing step (700) involves contacting the loaded sorbent (65) from the separation step (400) with an aqueous solution (70) to remove undesired impurities, to recover leaching agents, or both, from the loaded sorbent (65). The aqueous solution (70) may comprise water (to wash the sorbent), weak acidic or basic scrubbing agents (to avoid removing target metals), among others. The scrubbing step (700) is implemented preferably in the form of a conventional elution step. The scrubbing step (700) is performed preferably in a column, a tank, a vessel, or a pond.

The pulp scavenging step (800) involves contacting the barren pulp (90) from the separation (I) step (400) with the eluted sorbent (85) from the elution step (500), followed by a separation (II) step (900), to scavenge or recover remaining leaching agents, residual target metal(s), or both, from the pulp into the sorbent. If necessary, more than one scavenging steps may be implemented, each followed by a separation step. The scavenging step(s) (800) are implemented preferably in the form of conventional sorbent in pulp (SIP) step(s), in counter current configuration, involving either mechanical stirring or air assisted (pneumatic) stirring, and being performed either in a tank, a vessel, or a pond.

The blending step (100), the sorption leaching step (200), the dilution and pulp preparation step (300), the sorbent from pulp separation steps (400) and (900), the elution step (500), the scrubbing step (700), and the scavenging step (800) are performed preferably at a pressure in the range between 0.2 and 2 atm and at a temperature in the range between 2° C. and 100° C., more preferably at a pressure in the range between 0.8 and 1.2 atm and at a temperature in the range between 10° C. and 40° C., and most preferably at atmospheric pressure and at ambient temperature.

The refill of new sorbent to compensate the sorbent loss or consumption, e.g., due to sorbent attrition, breakdown or entrainment, may be performed in any part of the process. However, the fresh sorbent is added preferably to the eluted sorbent after the elution step (500) in the same ionic form.

In the preceding description of the invention and in the claims that follow, the words "comprise" or variations such as "comprises" or "comprising" are used in an inclusive sense, i.e., specifying the presence of stated features, but not precluding the presence or addition of further features in various embodiments of the invention.

It is to be understood that in this invention the preferred embodiments are not limited to those particular materials, target metals, and reagents described, as these may vary. It is also to be understood that the terminology used herein is for the purpose of describing particular embodiments only, and is not intended to limit the scope of the present invention in any way.

EXAMPLES

In order to provide further information regarding the invention, the following examples are provided. The examples presented below are representative only and are not intended to limit the present invention in any aspect.

Example 1

This example illustrates the recovery of copper from old copper flotation tailings characterised by high acid consumption. In the example, after sorption leaching in wet solids, the use of dilution and pulp preparation is compared with the use afterwards of a traditional RIP stage followed by a scavenging stage, according to the present invention. As leaching agents a combination of an ammonia solution and dry ammonium carbonate was used, whereas the sorbent was a (copper) selective ion exchange resin.

A sample of tailings having a dry weight of 600.15 g, a moisture of 2.1% (12.6 g), a total copper grade of 0.642% Cu (3.85 g Cu), and a soluble copper grade of 0.545% Cu (3.27 g Cu) was blended with 9.2 g of a 25 w/w % ammonia solution (2.30 g $NH_3$), 6.1 g of dry ammonium carbonate (2.16 g $NH_3$), 62.2 g of a (copper) selective ion exchange resin in $NH_4^+$ form, and 60 g of water, so as to form wet solids with 13.3% moisture by weight. The ion exchange resin in $NH_4^+$ form was obtained by previously contacting 84 ml of ion exchange resin in $H^+$ form with an ammonia solution so as to load 1.27 g $NH_4^+$ on the resin (1.20 g $NH_3$). The resulting wet solids mixture contained 3.27 g of soluble Cu and 5.67 g of (equivalent) total $NH_3$, having a total $NH_3$ to soluble Cu ratio of 1.73. After the blending step, sorption leaching in wet solids was performed during 24 hours.

Test 1.1:

After sorption leaching in wet solids, a portion of 262.0 g of the mixture (containing 1.35 g total Cu and 1.14 g soluble Cu) was just washed with 225 ml of water (i.e., dilution and pulp preparation), separating thereafter the resulting waste pulp (dry weight of 205.4 g) from the loaded resin (34 ml). The residual solids of the waste pulp contained a total copper grade of 0.161% Cu (0.33 g Cu) and a soluble copper grade of 0.090% Cu (0.19 g Cu). The residual solution of the waste pulp contained 0.6 mg Cu. The copper loaded onto the resin was 1.01 g Cu (i.e., the copper extracted from the tailings), achieving a copper recovery of 88.8% in reference to soluble copper in the feed.

Test 1.2:

After sorption leaching in wet solids, another portion of 262.8 g of the mixture (containing 1.35 g total Cu and 1.15 g soluble Cu) was diluted with 230 ml of water and stirred as a pulp (containing the resin) during 1 hour (i.e., dilution and pulp preparation followed by traditional RIP), separating thereafter the resulting pulp from the loaded resin (35 ml). The copper loaded onto the resin after RIP was 1.01 g Cu, achieving a copper recovery of 88.0% in reference to soluble copper. Fresh resin in $H^+$ form was then added to the pulp and stirred during 1 hour (i.e., scavenging), separating thereafter the resulting waste pulp (dry weight of 206.0 g) from the resin (37.5 ml). The residual solids of the waste pulp contained a total copper grade of 0.154% Cu (0.32 g Cu) and a soluble copper grade of 0.081% Cu (0.17 g Cu). The residual aqueous solution of the waste pulp contained 5 mg Cu. The copper loaded onto the resin during scavenging was 19 mg Cu, achieving a copper recovery in scavenging of 1.64% in reference to the 1.15 g soluble copper in the sample of the mixture. The total amount of copper extracted from the tailings was 1.03 g Cu, achieving after scavenging a copper recovery of 89.7% in reference to soluble copper in the feed.

The results of Tests 1.1-1.2 are summarised in Table 1.

TABLE 1

Summary of Tests 1.1-1.2.

| Parameter | Test 1.1 | Test 1.2 |
|---|---|---|
| Moisture in wet solids (%) | 13.3 | 13.3 |
| Total $NH_3$ to soluble Cu ratio | 1.73 | 1.73 |
| Copper recovery after dilution (%) | 88.8 | — |
| Copper recovery after RIP (%) | — | 88.0 |
| Copper recovery after scavenging (%) | — | 89.7 |

As can be appreciated in the example, copper recovery diminishes slightly from 88.8% to 88.0% when adding a traditional RIP stage after dilution and pulp preparation instead of just rinsing the resin with water. The inclusion of a scavenging stage after the RIP stage enhances copper recovery by 1.64%, resulting in a total copper recovery rate of 89.7%.

Example 2

This example quantifies the recovery of leaching agents and target metals in a scavenging step after separating the sorbent from the pulp, in accordance with the present invention, applied to copper extraction from old copper flotation tailings with high acid consumption. As leaching agents an ammonia solution and dry ammonium carbonate were used, whereas the sorbent was a (copper) selective ion exchange resin.

Test 2.1:

A sample of tailings having a dry weight of 400.6 g, a moisture of 2.1% (8.4 g), a total copper grade of 0.625% Cu (2.50 g Cu), and a soluble copper grade of 0.550% Cu (2.20 g Cu) was blended with 24.4 g of a 25 w/w % ammonia solution (6.10 g $NH_3$), 16.4 g of dry ammonium carbonate (5.81 g $NH_3$), 38.5 g of a (copper) selective ion exchange resin in $H^+$ form (52 ml), and 60 g of water, so as to form wet solids with 24.9% moisture by weight. The resulting wet solids mixture contained 2.20 g of soluble Cu and 11.91 g of (equivalent) total $NH_3$, having a total $NH_3$ to soluble Cu ratio of 5.41. After the blending step, sorption leaching in wet solids was performed during 24 hours. The wet solids mixture was then diluted with 400 ml of water, separating thereafter the resulting pulp from the loaded resin. The loaded resin contained 2.04 g Cu and 1.32 g $NH_3$, achieving a copper recovery of 92.4% in reference to soluble copper in the feed.

Fresh resin in $H^+$ form (52 ml) was added to the pulp and stirred during one hour (i.e., scavenging), separating thereafter the resin from the waste pulp (dry weight of 392.5 g). The residual solids of the waste pulp contained a total copper grade of 0.113% Cu (0.44 g Cu) and a soluble copper grade of 0.039% Cu (0.15 g Cu). The residual solution of the waste pulp contained 3 mg Cu. During scavenging the resin loaded 0.02 g Cu and 1.08 g $NH_3$, achieving a copper recovery of 0.94% in reference to soluble copper in the feed and an ammonia recovery of 9.1% in reference to total ammonia in the feed. The total amount of copper extracted from the tailings was 2.06 g Cu, achieving after scavenging a copper recovery of 93.4% in reference to soluble copper in the feed.

The results of Test 2.1 are summarised in Table 2.

TABLE 2

Summary of Test 2.1.

| Parameter | Test 2.1 |
|---|---|
| Moisture in wet solids (%) | 24.9 |
| Total $NH_3$ to soluble Cu ratio | 5.41 |
| Copper recovery after dilution (%) | 92.4 |
| Copper recovery after scavenging (%) | 93.4 |
| Ammonia recovery in scavenging (%) | 9.1 |

As can be appreciated in the example, the inclusion of a scavenging stage enhances copper recovery from 92.4% to 93.4% while 9.1% of ammonia is recovered from the barren pulp.

Example 3

This example illustrates the recovery of copper from old copper flotation tailings with high acid consumption, by comparing sorption leaching in wet solids (according to the present invention) with the operation of a conventional resin in pulp (RIP) mini pilot plant with 7 RIP stages. In both cases leaching was performed with a similar ratio of total ammonia to soluble copper. As leaching agents an ammonia solution and dry ammonium carbonate were used, whereas the sorbent was a (copper) selective ion exchange resin.

Test 3.1:

For sorption leaching in wet solids, a sample of tailings having a dry weight of 1000.4 g, a moisture of 2.1% (21.0 g), a total copper grade of 0.625% Cu (6.25 g Cu), and a soluble copper grade of 0.550% Cu (5.50 g Cu) was blended with 15.4 g of a 25 w/w % ammonia solution (3.85 g $NH_3$), 10 g of dry ammonium carbonate (3.54 g $NH_3$), 92.5 g of a (copper) selective ion exchange resin in $H^+$ form (125 ml), and 81 g of water, so as to form wet solids with 11.7% moisture by weight. The resulting wet solids mixture contained 5.50 g of soluble Cu and 7.39 g of (equivalent) total $NH_3$, having a total $NH_3$ to soluble Cu ratio of 1.34. After the blending step, sorption leaching in wet solids was performed during 24 hours.

After sorption leaching in wet solids, a portion of 360.5 g of the mixture (containing 1.85 g total Cu and 1.63 g soluble Cu) was diluted with 360 ml of water (i.e., dilution and pulp preparation), separating thereafter the resulting waste pulp (dry weight of 289.6 g) from the loaded resin (37 ml). The residual solids of the waste pulp contained a total copper grade of 0.161% Cu (0.47 g Cu) and a soluble copper grade of 0.096% Cu (0.28 g Cu). The residual aqueous solution of the waste pulp contained 4 mg Cu. The copper loaded onto the resin was 1.38 g Cu (i.e., the copper extracted from the tailings), achieving a copper recovery of 84.7% in reference to soluble copper in the feed.

Test 3.2:

For the RIP mini pilot plant, a sample of tailings having a dry weight of 7000.1 g, a moisture of 2.1% (147.0 g), a total copper grade of 0.642% Cu (44.94 g Cu), and a soluble copper grade of 0.545% Cu (38.15 g Cu) was mixed with a lixiviant containing 154.8 g of a 25 w/w % ammonia solution (38.70 g $NH_3$), 54.2 g of dry ammonium carbonate (19.21 g $NH_3$), and 10.5 kg of water, so as to form a pulp with 40.8% content of solids by weight (percent solids). The resulting pulp contained 38.15 g of soluble Cu and 57.91 g of (equivalent) total $NH_3$, having a total $NH_3$ to soluble Cu ratio of 1.52. The leaching process was performed in a mixing vessel (bucket) under constant stirring with an overhead mixer. After 4 hours of leaching, the pulp started to be fed consecutively into Reactor 1 of the 7 RIP reactors at the feed rate of ~1.0 liter per hour. A volume of ~80 ml of a fresh (copper) selective ion exchange resin in $H^+$ form was fed into Reactor 7 and was moving in a counter current manner to the pulp flow. The RIP process was run continuously during 9 hours. During this time, the total volumes of the pulp and the resin that passed through the RIP reactors were 9.18 liters and 645 ml, respectively. The residual solids of the waste pulp contained a total copper grade of 0.406% Cu (27.85 g Cu) and a soluble copper grade of 0.322% Cu (22.09 g Cu). The residual aqueous solution of the waste pulp contained 6 mg Cu. The copper loaded onto the resin was 17.08 g Cu (i.e., the copper extracted from the tailings), achieving a copper recovery of 44.8% in reference to soluble copper in the feed.

The results of Tests 3.1-3.2 are summarised in Table 3.

TABLE 3

Summary of Tests 3.1-3.2.

| Parameter | Test 3.1 | Test 3.2 |
|---|---|---|
| Moisture in wet solids (%) | 11.7 | — |
| Content of solids in RIP (%) | — | 40.8 |
| Total $NH_3$ to soluble Cu ratio | 1.34 | 1.52 |
| Copper recovery after dilution (%) | 84.7 | — |
| Copper recovery after RIP (%) | — | 44.8 |

As can be appreciated in the example, even with a slightly smaller total $NH_3$ to soluble Cu ratio (1.34 versus 1.52), sorption leaching in wet solids achieves substantially improved copper recovery (84.7%) in comparison to the mini pilot plant with 7 conventional RIP stages (44.8%).

Example 4

This example illustrates the recovery of both copper and cobalt with the same sorbent from an ore that was previously milled down below 75 microns. In the example, the blending step includes the addition of oxidising agents among the leaching agents and the sorption leaching step is performed at higher temperature, followed by a scavenging step, in accordance with the present invention. As leaching agents a sulphuric acid solution together with ferric nitrate and ferric chloride were used, whereas the sorbent was a strong acid cation (SAC) ion exchange resin.

Test 4.1:

For sorption leaching in wet solids, a sample of ore having a dry weight of 70 g, a moisture of 1.2% (0.8 g), a total copper grade of 1.9% Cu (1.31 g Cu), and a total cobalt grade of 0.25% Co (0.17 g Co) was blended with 13.4 g of a 33 w/w % sulphuric acid solution (4.4 g $H_2SO_4$), 1.4 g of $Fe(NO_3)_3$, 1.4 g of $FeCl_3$, 9.7 g of water, and (shortly thereafter) 44 g of a strong acid cation (SAC) ion exchange resin in $H^+$ form (60 ml), so as to form wet solids with 23.5% moisture by weight. After the blending step, sorption leaching in wet solids was performed during 24 hours at a temperature maintained in the range between 45° C. and 55° C. The wet solids mixture was then diluted with 50 ml of water, separating thereafter the resulting pulp from the loaded resin. The loaded resin contained 0.87 g Cu and 87 mg Co, achieving a copper recovery of 65.9% in reference to the total copper in the feed and a cobalt recovery of 50.1% in reference to the total cobalt in the feed.

At the scavenging stage fresh resin in H+ form (20 ml) was added to the pulp and stirred during two hours, separating thereafter the resin from the waste pulp (dry weight of 66.5 g). The residual solids of the waste pulp contained a total copper grade of 880 ppm Cu (59 mg Cu) and a total cobalt grade of 640 ppm Co (43 mg Co). The residual solution of the waste pulp contained 0.15 g Cu and 16 mg Co. During scavenging the resin loaded 0.20 g Cu and 20 mg Co, achieving a copper recovery of 15.1% in reference to the total copper in the feed and a cobalt recovery of 11.3% in reference to the total cobalt in the feed. In terms of metal loading onto resins in comparison to the metal contained in waste pulp and resins, the total copper and cobalt recovery rates of 83.7% and 64.3% were achieved, respectively.

The results of Test 4.1 are summarised in Table 4.

TABLE 4

Summary of Test 4.1.

| Parameter | Test 4.1 |
|---|---|
| Moisture in wet solids (%) | 23.5 |
| Copper recovery after scavenging (%) | 83.7 |
| Cobalt recovery after scavenging (%) | 64.3 |

As can be appreciated in the example, both copper and cobalt were recovered from ore in one process and with the same SAC resin.

What is claimed is:

1. A process for the selective extraction of one or more target metals from ore, concentrates, tailings, slags or other metal bearing solids, comprising the steps of:
   a) blending the metal bearing solids with acidic or basic leaching agents, one or more sorbents, and a sufficient amount of an aqueous solution to wet substantially both the metal bearing solids and the sorbent without formation of a slurry, thereby obtaining wet solids;
   b) performing sorption leaching in the state of wet solids;
   c) diluting the wet solids and preparing a pulp by adding an aqueous solution;
   d) separating a loaded sorbent from the pulp;
   e) eluting target metals from the loaded sorbent with an eluent to an eluate, returning thereafter the sorbent back to the blending step (a);
   f) recovering target metals from the eluate to obtain one or more final metal products, returning the eluent back to the elution step (e).

2. The process of claim 1 further comprising the step of scrubbing the sorbent before the elution step (e), whereby the loaded sorbent from the separation step (d) is contacted with an aqueous solution, and the resulting scrubbing solution is returned thereafter to the blending step (a) or to the dilution and pulp preparation step (c).

3. The process of claim 2 wherein the scrubbing step is conducted in a column, a tank, a vessel, or a pond.

4. The process of claim 1 further comprising the steps of scavenging the pulp of the separation step (d) by contacting said pulp with the eluted sorbent from the elution step (e), followed by separating sorbent from the pulp of said scavenging step and returning the sorbent to the blending step (a).

5. The process of claim 4 comprising more than one group of scavenging steps followed by sorbent from pulp separation steps, transferring the pulp and the sorbent in counter current manner between the scavenging steps, after separating sorbent from pulp in each step.

6. The process of claim 4 wherein the scavenging step is conducted in a tank, a vessel, or a pond, and involves mechanical stirring or air assisted stirring.

7. The process of claim 1, 4 or 5 wherein the sorbent from pulp separation steps are performed using one or more screens, or one or more static or vibrating sieves.

8. The process of claim 1 wherein the sorbent is selected from the group consisting of activated carbon, zeolites, ion exchange resins or mixtures thereof.

9. The process of claim 1 wherein the target metal is selected from the group consisting of copper, nickel, cobalt, zinc, silver, gold, platinum, palladium, rhodium, mercury, chromium, cadmium, molybdenum, rhenium, uranium, and combinations thereof.

10. The process of claim 1 wherein the leaching agents comprise at least one element selected from the group consisting of sulphuric acid, hydrochloric acid, nitric acid, phosphoric acid, carbonic acid, citric acid, acetic acid, oxalic acid, formic acid, ammonia, cyanide, urea, thiourea, thiosulphate, and mixtures thereof.

11. The process of claim 10 wherein the leaching agents further comprise salts selected from the group consisting of sulphates, chlorides, nitrates, phosphates, carbonates, ammonium salts, acetates, oxalates, cyanides, formates, citrates, hypochlorites, bromides, and combinations thereof, and wherein the leaching agents further comprise oxidising or reducing agents selected from the group consisting of oxygen, air, chlorine, hydrogen peroxide, calcium peroxide, manganese dioxide, ferric nitrate, sulphur dioxide, hydrogen sulphide, ferric chloride, magnesium oxide, sodium hypochlorite, elemental iron, elemental aluminium, elemental zinc, elemental magnesium, scrap metals, and combinations thereof.

12. The process of claim 1 wherein for the effective separation of sorbent from solids the metal bearing solids have a particle size below 0.5 mm and the sorbent has a particle size greater than about 0.6 mm.

13. The process of claim 1 wherein the amount of aqueous solution added to the blending step (a) is measured so as to form wet solids with a moisture content by weight in the range between 2 and 30 percent per dry weight of solids.

14. The process of claim 1 wherein the residence time in the sorption leaching step (b) is chosen in the range between 10 minutes and 120 hours.

15. The process of claim 1 wherein the amount of aqueous solution used to prepare the pulp in the dilution and pulp preparation step (c) is measured in such a way so as to form the pulp with the content of solids in the range of 5 to 70 percent weight of the pulp.

16. The process of claim 1 wherein the metal elution step (e) is performed in one or more elution columns to generate the eluate with an acidic or basic solution as eluent, whereby the involved acid or base is selected from the group consisting of sulphuric acid, hydrochloric acid, nitric acid, phosphoric acid, carbonic acid, citric acid, acetic acid, oxalic acid, formic acid, ammonia, cyanide, urea, thiourea, thiosulphate, and mixtures thereof.

17. The process of claim 1 wherein the metal recovery step (f) comprises electrowinning, precipitation, cementation, crystallisation, evaporation, smelting, electrorefining, membranes, separation of individual target metals from each other, and combinations thereof.

18. The process of claim 1 wherein the blending step (a) is performed in an agglomeration drum, a drum mixer, a pelletising disk, a tank, a vessel, or a conveyor belt, wherein the sorption leaching step (b) is performed in a tank, a vessel, a pond, a pile, a heap, a dump, a conveyor belt, or a hopper, and wherein the dilution and pulp preparation step (c) is conducted in a tank, a vessel, a pond, a pile, a heap, or a dump, and involves mechanical stirring, air assisted stirring, or hydraulic mining.

* * * * *